United States Patent
Pacheco

(10) Patent No.: US 12,049,321 B2
(45) Date of Patent: Jul. 30, 2024

(54) AIRCRAFT BULKHEAD-MOUNTED PILOT SEAT WITH HORIZONTAL AND VERTICAL ADJUSTMENT

(71) Applicant: AMI Industries, Inc., Colorado Springs, CO (US)

(72) Inventor: Chad R. Pacheco, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 97 days.

(21) Appl. No.: 17/941,674

(22) Filed: Sep. 9, 2022

(65) Prior Publication Data

US 2024/0083583 A1   Mar. 14, 2024

Related U.S. Application Data

(63) Continuation-in-part of application No. 17/940,873, filed on Sep. 8, 2022.

(51) Int. Cl.
*B64D 11/06* (2006.01)
*B64D 25/04* (2006.01)

(52) U.S. Cl.
CPC ........ *B64D 11/064* (2014.12); *B64D 11/0698* (2014.12); *B64D 25/04* (2013.01)

(58) Field of Classification Search
CPC .... B64D 25/04; B64D 11/0698; B64D 11/064
See application file for complete search history.

(56) References Cited

U.S. PATENT DOCUMENTS

| 2,945,654 A | 7/1960 | Woodward et al. |
| 3,572,828 A | 3/1971 | Lehner |

(Continued)

FOREIGN PATENT DOCUMENTS

| CN | 105416325 A | 3/2016 |
| EP | 2671800 B1 | 4/2017 |

(Continued)

OTHER PUBLICATIONS

Extended European Search Report dated Dec. 19, 2023; European Application No. 23191116.5.

(Continued)

*Primary Examiner* — Brady W Frazier
*Assistant Examiner* — Shanna Danielle Glover
(74) *Attorney, Agent, or Firm* — Suiter Swantz IP

(57) ABSTRACT

A bulkhead-mounted aircraft seat assembly configured for independent vertical and horizontal adjustment includes an aircraft seat (seatback and seat frame/cushion) for supporting a pilot, passenger, or other occupant. Parallel rails attach to the bulkhead and extend along the bulkhead (vertically or near vertically) with opposing slots set into each rail. A sled translates along the rails via paired sliding members set into the slots, each pair of sliding members connected to an axle extending through the sled. A four-bar linkage attached to the sled and to the aircraft seat; the four-bar linkage extends from a default position to allow the aircraft seat to translate along a horizontal linear rail under the seat while maintaining a stable vertical reference point above the cabin floor. The seat is independently configured for substantially vertical adjustment via a metering plate attached to the bulkhead.

6 Claims, 5 Drawing Sheets

(56) References Cited

U.S. PATENT DOCUMENTS

| | | | |
|---|---|---|---|
| 3,630,478 | A | 12/1971 | Klepp |
| 4,004,763 | A | 1/1977 | Bunnell, III et al. |
| 4,525,010 | A | 6/1985 | Trickey et al. |
| 5,791,597 | A | 8/1998 | Knoll |
| 6,378,939 | B1 | 4/2002 | Knoll et al. |
| 7,293,830 | B2 | 11/2007 | Marotta et al. |
| 10,052,984 | B1 | 8/2018 | Bosen et al. |
| 2003/0052229 | A1 | 3/2003 | Mort |
| 2012/0006873 | A1* | 1/2012 | Chinn ................. A61G 3/0866 224/545 |
| 2013/0229038 | A1 | 9/2013 | Marshall |
| 2015/0145295 | A1 | 5/2015 | Cecinas et al. |
| 2019/0118680 | A1 | 4/2019 | Sagebiel |
| 2021/0094690 | A1* | 4/2021 | Darbyshire ............ B60N 2/345 |

FOREIGN PATENT DOCUMENTS

| | | | |
|---|---|---|---|
| GB | 774129 A | 5/1957 | |
| IL | 148857 A | 8/2006 | |

OTHER PUBLICATIONS

Extended European Search Report dated Jan. 17, 2024; European Application No. 23195098.1.

* cited by examiner

AIRCRAFT BULKHEAD-MOUNTED PILOT SEAT WITH HORIZONTAL AND VERTICAL ADJUSTMENT

CROSS-REFERENCE TO RELATED APPLICATIONS

The instant application is related to, and incorporates by reference in its entirety, commonly owned U.S. patent application Ser. No. 17/940,873 having, filed Sep. 8, 2022 and titled AIRCRAFT SEAT WITH ENERGY ATTENUATING METERING PLATE.

BACKGROUND

Aircraft seats, for example pilot or crew seats in a rotorcraft cockpit, may attach directly to a rear wall of bulkhead rather than to the cabin floor. Such seats may be capable of at least a limited amount of vertical adjustment, or adjustment of the seat height relative to the cabin floor. While vertical adjustment may help the aircraft seat accommodate a broader range of taller or shorter pilots, for example, there is as yet no corresponding capacity for horizontal adjustment of the seat.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

SUMMARY

Figure 1:
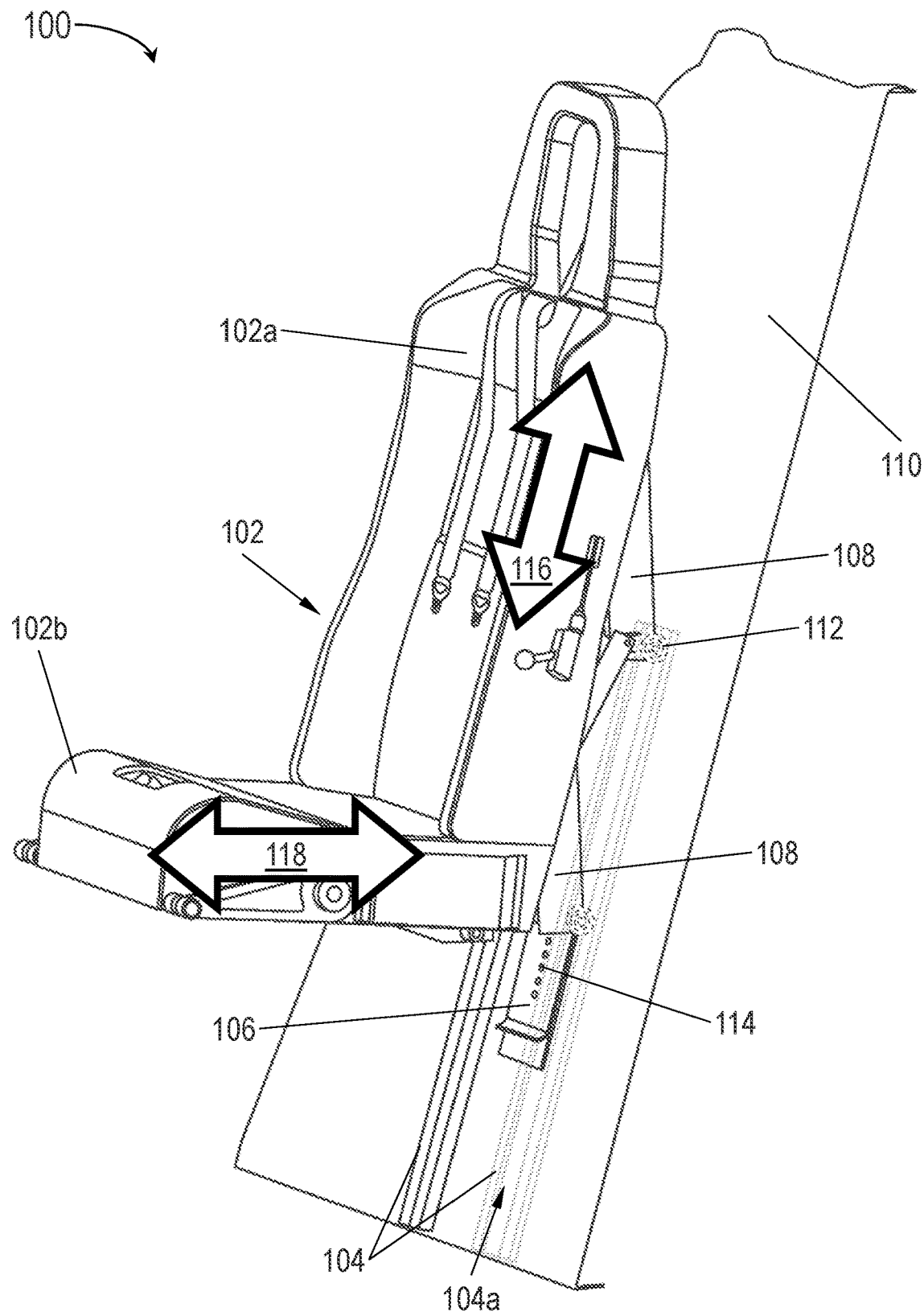
FIG. 1 is a forward left-side isometric view of an aircraft seat assembly incorporating vertical and horizontal adjustment according to example embodiments of the inventive concepts disclosed herein.

A bulkhead-mounted aircraft seat configured for independent horizontal and vertical adjustment is disclosed. In embodiments, the aircraft seat includes a seatback and seat frame/cushion for supporting an occupant. Parallel rails attach to the bulkhead and extend along the bulkhead (vertically or near vertically) with opposing slots set into each rail. A sled translates along the rails via paired sliding members set into the slots, each pair of sliding members connected to an axle extending through the sled. A four-bar linkage attached to the sled and to the aircraft seat; the four-bar linkage extends from a default position to allow the aircraft seat to translate along a horizontal linear rail under the seat while maintaining a stable vertical reference point above the cabin floor. The seat is independently configured for substantially vertical adjustment via a metering plate attached to the bulkhead.

In some embodiments, the sled includes an upper pair and a lower pair of sliding members, each pair of sliding members (e.g., left-side and right-side) connected to an upper or lower axle extending through the sled and translating through left-side and right-side slots respectively.

In some embodiments, the aircraft seat assembly includes a linear lock for securing the aircraft seat in the desired horizontal position along the linear rail (e.g., relative to the bulkhead).

In some embodiments, the metering plate is configured for energy attenuation via controlled deformation to control downward deceleration of the aircraft seat in response to an impact event.

In some embodiments, the aircraft seat is held at a desired height by a spring-loaded locking pin which extends through a hole in the sled and a second hole in the metering plate, the metering plate including a substantially vertical sequence of holes where each hole corresponds to a desired height of the seat. For example, an occupant of the seat may release the locking pin via a handle to articulate the aircraft seat to a higher or lower desired height, releasing the handle to restore the locking pin through the sled hole and higher or lower metering hole and securing the aircraft seat to the new desired height.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a seat assembly for a rotorcraft or other aircraft that attaches directly to a rear bulkhead, e.g., of a rotorcraft cockpit. While the aircraft seat is capable of vertical adjustment, e.g., height adjustment of the aircraft seat relative to the cabin floor, the aircraft seat is also capable of horizontal adjustment. For example, the aircraft seat may be adjusted forward or backward relative to the bulkhead, e.g., along an x-axis. Further, the horizontal adjustment mechanism maintains the vertical seat position (e.g., the height of the seat relative to the floor) within a narrow tolerance during horizontal adjustment.

Referring now to FIG. 1, an aircraft seat assembly 100 is shown. The aircraft seat assembly may include an aircraft seat 102, seat base rails 104, metering plate 106, and linkage 108.

In embodiments, the aircraft seat assembly 100 may attach directly to a rear bulkhead 110, e.g., within a rotorcraft cockpit or like aircraft interior space, rather than to a cabin floor. For example, two parallel seat base rails 104 may be rigidly attached to the bulkhead 110, e.g., a left-side rail and a right-side rail in a spaced apart relationship. The aircraft seat 102 may include a seatback 102a and a seat frame/seat cushion 102b collectively capable of supporting an occupant of the seat; for example, the seatback and seat frame/seat cushion may be two separate components or may be combined into a single component.

In embodiments, the aircraft seat 102 may attach to the bulkhead 110 via a sled (not shown), the sled capable of translation along the left-side and right-side seat base rails 104 via sliding members 112 (e.g., rolling members). For example, each seat base rail 104 may include a slot 104a extending substantially the length of the base rail, the sliding member 112 capable of translating through the slot.

In embodiments, the aircraft seat 102 may be spring-loaded to a default height above the cabin floor and secured to the default height via a locking pin (306, FIG. 3; e.g., "pop pin") inserted through a hole 114 in the metering plate 106. For example, the metering plate 106 may include a substantially vertical array of holes 114, each hole corresponding to a height to which the aircraft seat 102 may be secured. Vertical adjustment (116; e.g., height adjustment) of the aircraft seat 102 by the occupant of the aircraft seat 102 may be achieved by releasing the locking pin from the metering plate 106, allowing the aircraft seat to translate freely along the seat base rails 104. In some embodiments, the occupant may raise or lower the aircraft seat 102 to a new desired height by shifting their weight in the aircraft seat, e.g., pushing the seat downward or allowing the seat to rise toward the default height, and secure the aircraft seat to the new desired height by reinserting the locking pin in the appropriate hole 114 in the metering plate.

Figure 2:
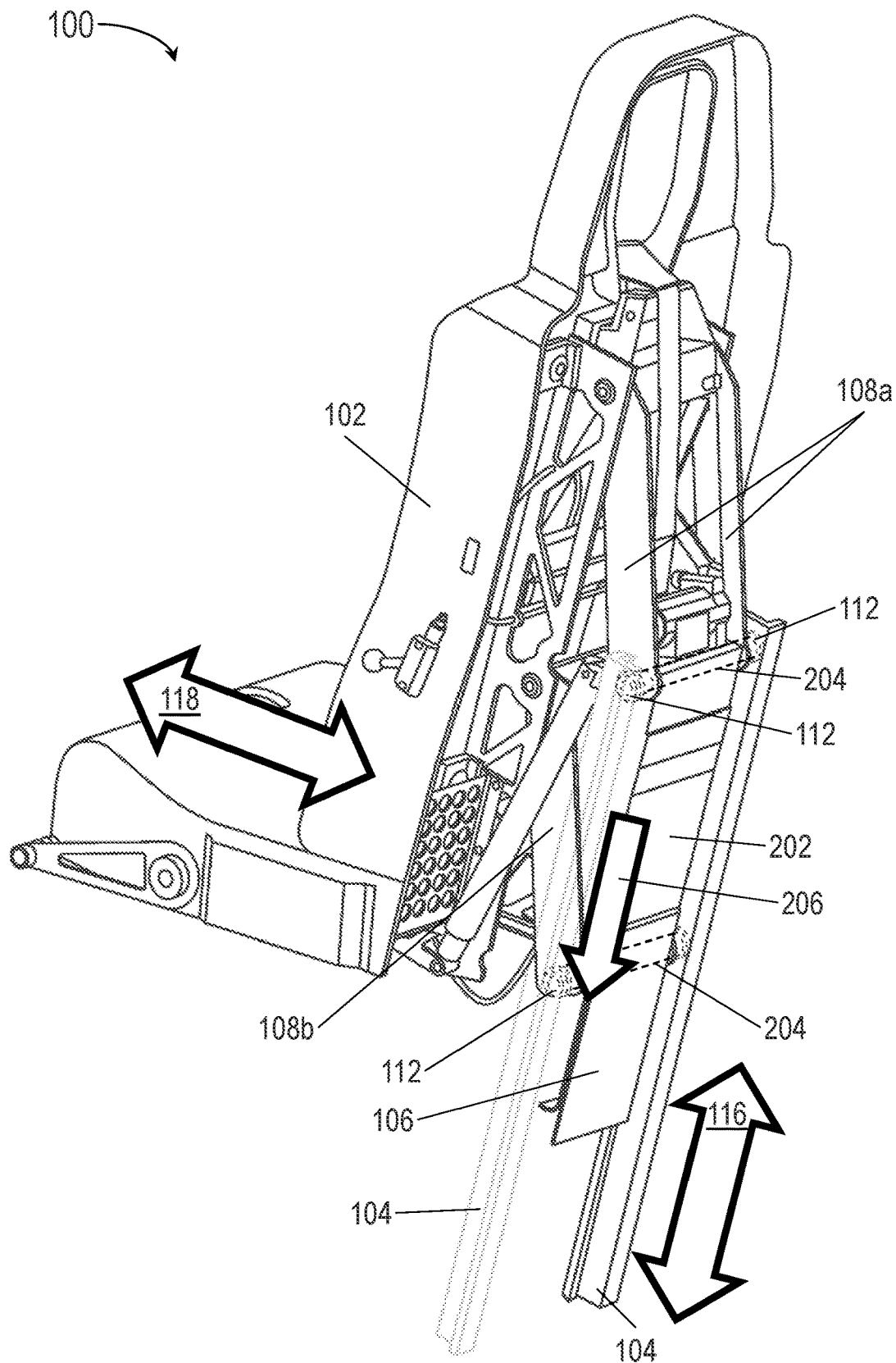
FIG. 2 is a rear left-side isometric view of the aircraft seat assembly of FIG. 1.

Referring also to FIG. 2, in embodiments, the aircraft seat 102 may be capable of horizontal adjustment (118), as well as vertical adjustment (116), relative to the bulkhead 110. For example, the linkage 108 may operate as a four-bar linkage, including an upper portion 108a and a lower portion 108b attached to the aircraft seat 102 and to the sled 202, the linkage pivotable at both ends. For example, the sled 202 (e.g., to which the aircraft seat 102 may be fixed) may translate relative to the seat base rails 104 via pairs of sliding members 112, each pair of sliding members including a left-side sliding member capable of translation along the slot of the left-side seat base rail and a right-side sliding member capable of translation along the slot of the right-side seat base rail. In embodiments, each opposing pair of sliding members (e.g., left and right) may be joined to an axle 204 extending through the sled 202. For example, the upper portion 108a of the linkage 108 may be connected to an upper axle 204 and may pivot relative to the upper axle; similarly, the lower portion 108b of the linkage may be connected, and may pivot relative to, a lower axle. In embodiments, the linkage 108 may pivot to allow the occupant to articulate the aircraft seat 102 along the horizontal axis 118, e.g., forward or backward relative to the bulkhead 110 (and allowing the aircraft seat 102 to accommodate a broader range of pilot sizes).

In some embodiments, the metering plate 106 may be configured for energy attenuation (EA). For example, in response to a crash event associated with a downward load (e.g., a rapid downward deceleration) on the aircraft seat 102 and its occupant, the aircraft seat may stroke downward (206) along the seat base rails 104, the metering plate 106 deforming to absorb at least a portion of the load as it deforms, slowing the deceleration of the aircraft seat (as disclosed by U.S. patent application Ser. No. 17/940,873, which application is herein incorporated by reference in its entirety).

Figure 3:
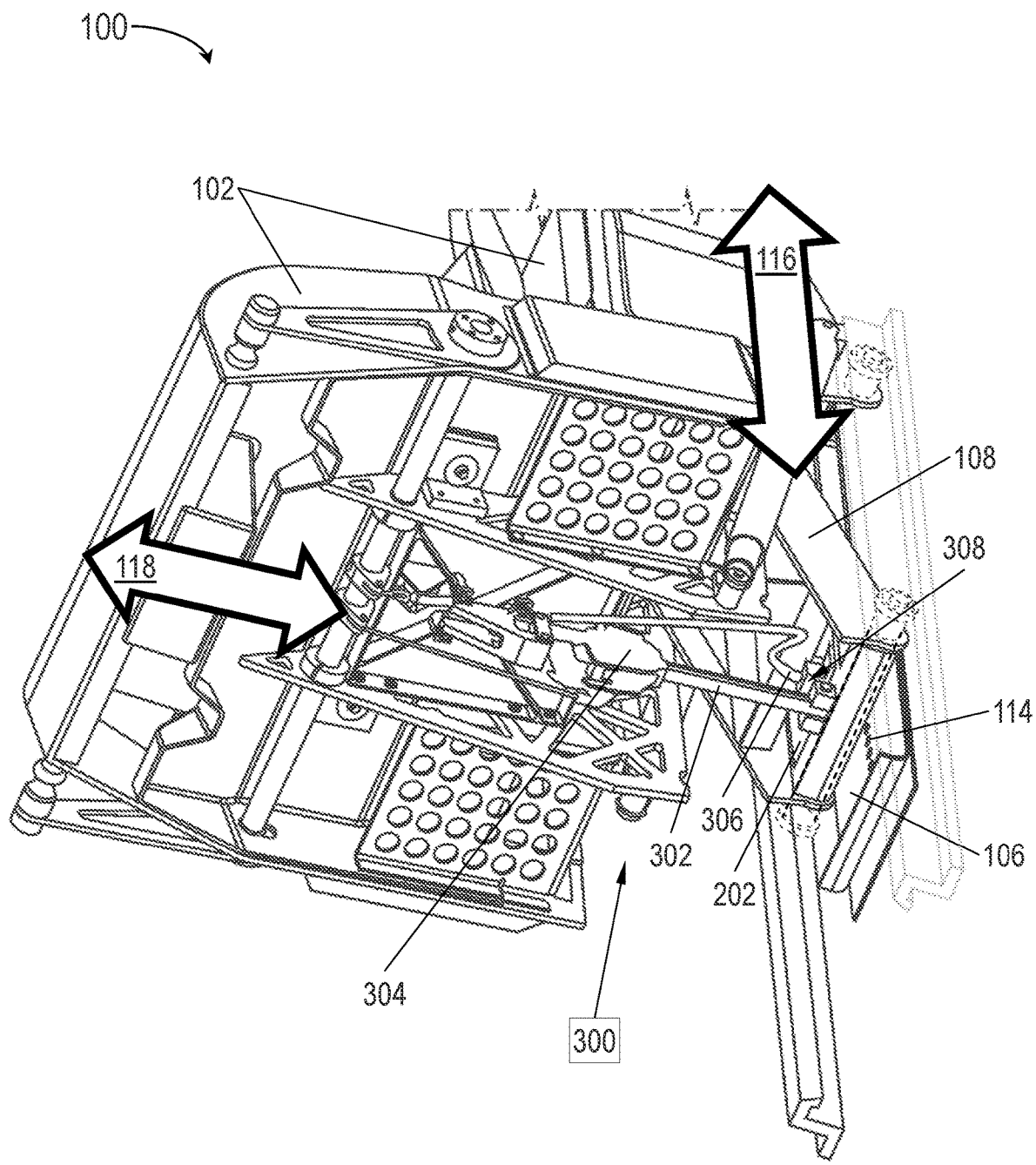
FIG. 3 is an underside view of the aircraft seat assembly of FIG. 1.

Referring now to FIG. 3, the aircraft seat assembly 100 is shown.

In embodiments, the aircraft seat assembly 100 may include a linear lock assembly 300 comprising a linear track 302 and a sliding carriage 304 capable of horizontal translation along the linear track. For example, the linear track 302 may attach to the sled 202 and project forward therefrom, defining a substantially horizontal axis (118). In embodiments, the sliding carriage 304 may secure to the linear track 302 to lock the aircraft seat 102 in a desired horizontal position relative to the bulkhead (110, FIG. 1).

In embodiments, the occupant of the aircraft seat 102 may vertically adjust (116) the aircraft seat by releasing the locking pin 306 and actuating the aircraft seat to a new desired height as described above. For example, the locking pin 306 may be spring-loaded to a default configuration wherein the locking pin is inserted through a hole 308 extending through the sled 202 and through a hole 114 in the metering plate 106. In embodiments, when the aircraft seat 102 has reached the new desired height, the occupant may re-insert the locking pin 306 into the hole 308 and into the hole 114 in the metering plate 106 corresponding to the new desired height.

In embodiments, the occupant may horizontally articulate the aircraft seat 102 by releasing the sliding carriage 304 from the linear track 302 and actuating the aircraft seat along the horizontal axis 118 to the new desired position. For example, the linkage 108 may pivot between the aircraft seat 102 and the sled 202, allowing the aircraft seat to translate forward or backward along the linear track. When the new desired position on the linear track 302 is reached, the occupant may lock the aircraft seat 102 to the new desired position via the sliding carriage.

Figure 4A:
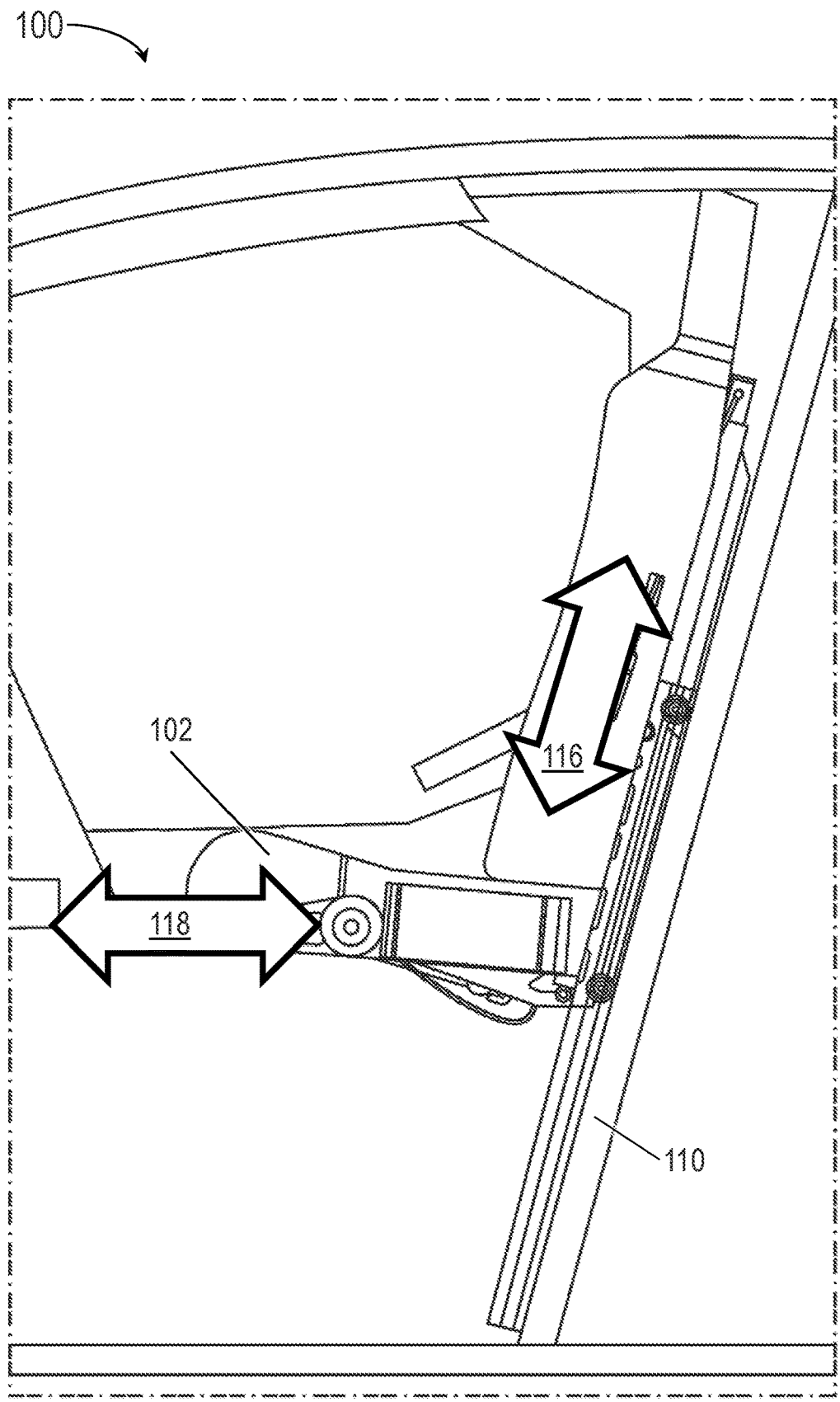
FIG. 4A is a left-side profile view of the aircraft seat assembly of FIG. 1 in a default horizontal position.
Figure 4B:
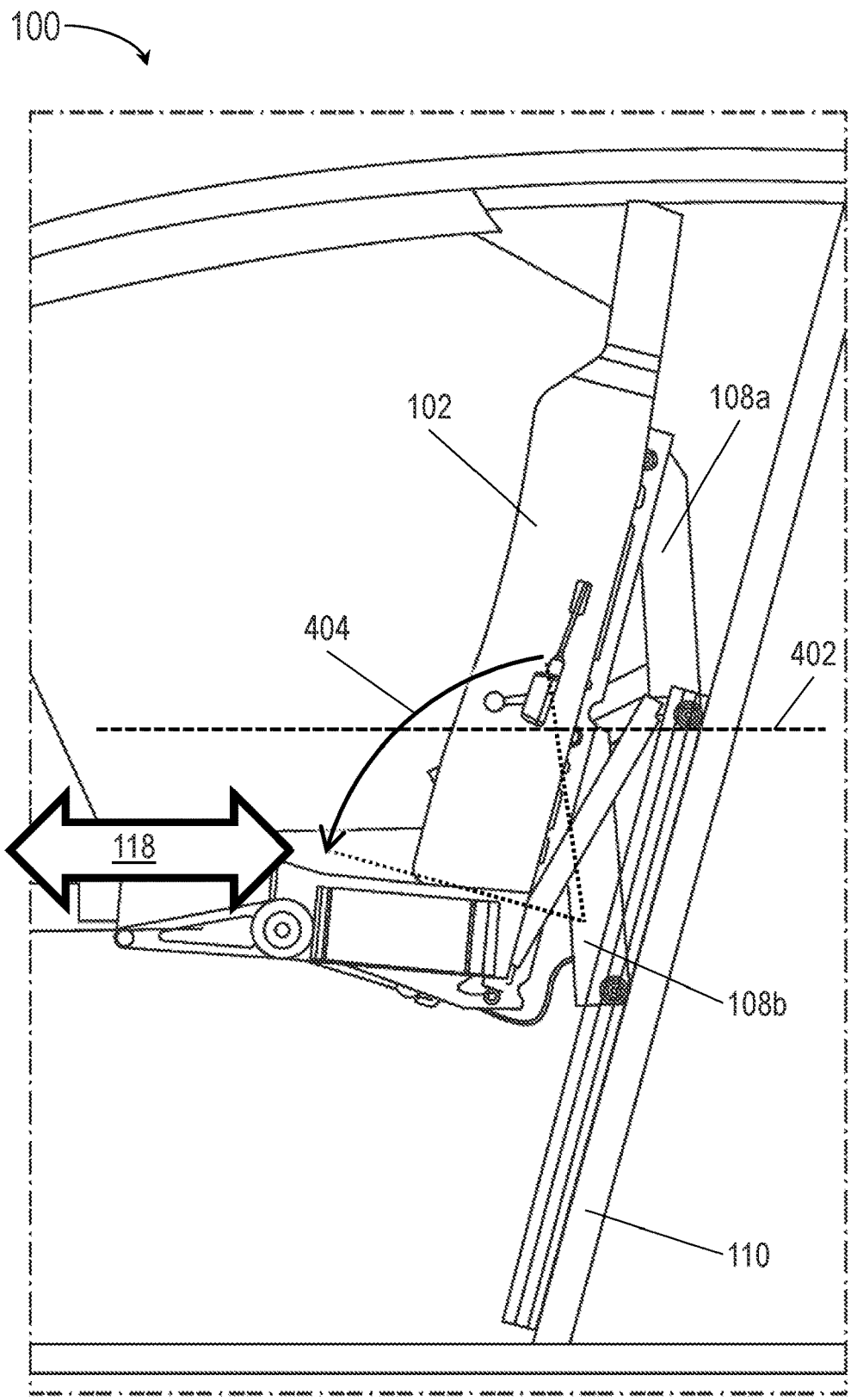
FIG. 4B is a left-side profile view of the aircraft seat assembly of FIG. 4A in an extended horizontal position.

Referring now to FIGS. 4A and 4B, the aircraft seat assembly 100 is shown.

In embodiments, horizontal adjustment 118 of the aircraft seat 102 relative to the bulkhead 110 may be achieved independently of vertical adjustment 116 of the aircraft seat, and vice versa. For example, the aircraft seat 102 is shown by FIG. 4A at a default horizontal position, e.g., wherein the aircraft seat 102 is closest to the bulkhead 110, and by FIG. 4B at a maximum horizontal distance from the bulkhead (e.g., as allowed by the placement of other fixtures or objects within a cockpit 400 or control area wherein the aircraft seat assembly 100 is situated, where continued horizontal adjustment of the aircraft seat may collide or interfere with said other fixtures or objects). In embodiments, full horizontal adjustment of the aircraft seat 102 may be possible at any selected height of the aircraft seat, and full vertical adjustment of the aircraft seat may be possible at any position of the aircraft seat along the linear track (302, FIG. 3).

In embodiments, the upper and lower linkages 108a, 108b may be sized to provide adjustment 118 of the aircraft seat 102 along the linear track while maintaining the vertical seat reference point 402 (VSRP) within a minimal tolerance. For example, given a bulkhead 110 at an angle of 15 degrees from vertical and a desired range of horizontal adjustment (e.g., 4 inches), the upper and lower linkages 108a, 108b may be sized (e.g., bar length) so as to provide sufficient rotational radius 404 that the aircraft seat 102 may be horizontally adjusted with minimal variation in VSRP 402. In embodiments, the achievable VSRP tolerance may vary according to the length of the upper and lower linkages 108a, 108b and the desired range of horizontal adjustment. For example, shorter upper and lower linkages 108a, 108b and/or greater desired ranges of horizontal adjustment may both increase the achievable VSRP tolerance.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. An aircraft seat assembly, comprising:
   an aircraft seat capable of supporting an occupant;
   two parallel rails attachable to a bulkhead of an aircraft, each rail including a slot set thereinto and extending along the rail;
   a sled disposed between the two rails and slidably attached to each rail via at least two pairs of sliding members, each pair including a left-side sliding member configured for translation along a left-side slot and a right-side sliding member configured to translation along a right-side slot, the sled including at least one first hole set thereinto;
   a four-bar linkage pivotably attached to the sled and to the aircraft seat, the linkage including at least an upper portion and a lower portion;
   a metering plate disposed between the two parallel rails behind the sled, the metering plate including a substantially vertical array of second holes set thereinto, each second hole associated with a height of the aircraft seat; and
   a locking pin controllable by the occupant;
   wherein the locking pin is configured for insertion through the first hole and a second hole of the array to secure the aircraft seat at a height associated with the second hole; and
   wherein the four-bar linkage is configured for horizontal articulation of the aircraft seat relative to the bulkhead.

2. The aircraft seat assembly of claim 1, wherein the at least two pairs of sliding members include:
   an upper pair connected by an upper axle extending through the sled and a lower pair connected by a lower axle extending through the sled,
   the upper portion of the linkage pivotably attached to the upper axle and the lower portion of the linkage pivotably attached to the lower axle.

3. The aircraft seat assembly of claim 1, further comprising:
   a linear locking mechanism configured to secure the aircraft seat in at least one horizontal position relative to the bulkhead.

4. The aircraft seat assembly of claim 1, wherein the metering plate is configured for energy attenuation in response to an impact event via controlled deformation in a downward direction.

5. The aircraft seat assembly of claim 1, wherein:
   the locking pin is held in a default configuration by at least one spring, the default configuration associated with insertion through the first hole and the second hole; and
   wherein the locking pin is operatively coupled to a handle controllable by the occupant, the handle articulable to release the locking pin from the first hole and the second hole for adjustment of the aircraft seat to a new desired height.

6. The aircraft seat assembly of claim 3, wherein the linear locking mechanism comprises:
   a linear track attached to the sled and projecting forward therefrom; and
   a sliding carriage attached to the aircraft seat and configured for translating along the linear track and for securing to the linear track to lock the aircraft seat in the at least one horizontal position relative to the bulkhead.

* * * * *